United States Patent
Mora et al.

(10) Patent No.: US 11,624,434 B2
(45) Date of Patent: Apr. 11, 2023

(54) ISOLATOR

(71) Applicant: GATES CORPORATION, Denver, CO (US)

(72) Inventors: Anthony R. Mora, Waterford, MI (US); Alexander Serkh, Troy, MI (US); Keming Liu, Sterling Heights, MI (US); Xiaohua Joe Chen, Windsor (CA)

(73) Assignee: Gates Corporation, Denver, CO (US)

( * ) Notice: Subject to any disclaimer, the term of this patent is extended or adjusted under 35 U.S.C. 154(b) by 971 days.

(21) Appl. No.: 16/441,985

(22) Filed: Jun. 14, 2019

(65) Prior Publication Data

US 2020/0393033 A1 Dec. 17, 2020

(51) Int. Cl.
| | | |
|---|---|---|
| *F16H 55/36* | (2006.01) | |
| *F16F 9/14* | (2006.01) | |
| *F16F 15/121* | (2006.01) | |
| *F16F 15/16* | (2006.01) | |

(52) U.S. Cl.
CPC ............. *F16H 55/36* (2013.01); *F16F 9/145* (2013.01); *F16F 15/1215* (2013.01); *F16F 15/16* (2013.01); *F16F 2222/12* (2013.01); *F16F 2224/04* (2013.01); *F16F 2232/02* (2013.01); *F16H 2055/366* (2013.01)

(58) Field of Classification Search
CPC ...... F16F 15/1215; F16F 15/16; F16F 15/161; F16F 9/145; F16F 2222/12; F16F 2224/04; F16F 2232/02; F16H 55/36; F16H 2055/366; F16H 7/1227
See application file for complete search history.

(56) References Cited

U.S. PATENT DOCUMENTS

| | | | |
|---|---|---|---|
| 8,888,622 B2 | 11/2014 | Chen et al. | |
| 9,441,677 B2 | 9/2016 | Williams et al. | |
| 9,759,266 B1* | 9/2017 | Serkh | F16D 7/022 |
| 2007/0254756 A1* | 11/2007 | Kawamoto | F16H 55/36 |
| | | | 474/70 |
| 2012/0298474 A1* | 11/2012 | Ward | F16H 55/36 |
| | | | 192/41 S |
| 2015/0184703 A1* | 7/2015 | Shimamura | F16D 3/12 |
| | | | 192/41 S |
| 2018/0045287 A1* | 2/2018 | Imai | F16C 33/782 |

FOREIGN PATENT DOCUMENTS

| | | | | |
|---|---|---|---|---|
| DE | 102007038209 B3 * | 1/2009 | | F16H 55/36 |
| JP | 4942707 B2 * | 5/2012 | | |
| WO | WO-2019092075 A1 * | 5/2019 | | F16H 55/36 |

* cited by examiner

*Primary Examiner* — Daniel D Yabut
(74) *Attorney, Agent, or Firm* — Kevin J. Aiken, Esq.

(57) ABSTRACT

An isolator comprising a pulley having a pulley stop, a plate attached to the pulley, a shaft, the pulley journalled to the shaft, a torsion spring attached to the shaft, a damping member attached to the torsion spring, the damping member disposed between the plate and the pulley, and the damping member compressing a damping fluid against the pulley stop.

13 Claims, 6 Drawing Sheets

ISOLATOR

FIELD OF THE INVENTION

The invention relates to an isolator, and more particularly, to an isolator having a damping member compressing a damping fluid against a pulley stop.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

The alternator isolator decoupler (AID) is a belt drive tuning device in the form of an alternator pulley. It is used to isolate vibrations and make accessory belt drive systems (ABDS) run more smoothly. The problem is that until now, the AID has always been a unidirectional device. Belt Driven Starter-Generator (BSG) systems are becoming more common and these systems have the functionality that the motor generator unit/belt starter-generator (MGU) can drive the belt in addition to the crank. Therefore they require a pulley with bidirectional functionality of which there has yet to be a tuning device to exhibit this characteristic. Therefore, a solid pulley on the alternator is typically coupled with an expensive crank torsional vibration damper tuning device. Not only is the crank damper expensive, most do not afford isolation or decoupling functionalities. Additionally, tensioners with high damping are also required to handle the demands of alternating tight and slack belt sides in BSG systems.

Representative of the art is U.S. Pat. No. 8,888,622 which discloses an isolator decoupler comprising a shaft, a pulley journalled to the shaft, a clutch carrier journalled to the shaft through a one-way clutch, a torsion spring engaged between the pulley and the clutch carrier, the torsion spring loadable in an unwinding direction, the torsion spring and the pulley having a predetermined clearance between a torsion spring outside diameter surface and a pulley inside diameter surface, and whereby the torsion spring outside diameter surface and a pulley inside diameter surface come into a progressive frictional engagement by torque load dependent radial expansion of the torsion spring.

What is needed is an isolator having a damping member compressing a damping fluid against a pulley stop. The present invention meets this need.

SUMMARY OF THE INVENTION

The primary aspect of the invention is an isolator having a damping member compressing a damping fluid against a pulley stop.

Other aspects of the invention will be pointed out or made obvious by the following description of the invention and the accompanying drawings.

The invention comprises an isolator comprising a pulley having a pulley stop, a plate attached to the pulley, a shaft, the pulley journalled to the shaft, a torsion spring attached to the shaft, a damping member attached to the torsion spring, the damping member disposed between the plate and the pulley, and the damping member compressing a damping fluid against the pulley stop.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

The instant invention affords isolation and decoupling capabilities in both directions as it utilizes a torsion spring that is connected to a series of bidirectional parts through a series of welds. The device can be loaded in either operational direction coupled with a decoupling and torque transmitting ring. This decoupling occurs when the rotor moves faster than the pulley, a phenomenon referred to as overrunning. It also affords damping characteristics through viscous drag. Not only does the viscous drag damp the system, it also has the advantage that it functions to eliminate impact noise from spring engagement. This solves the problem of having to introduce an expensive crank damper, tensioner with high damping, and introduces isolation into MGU systems.

Figure 1:
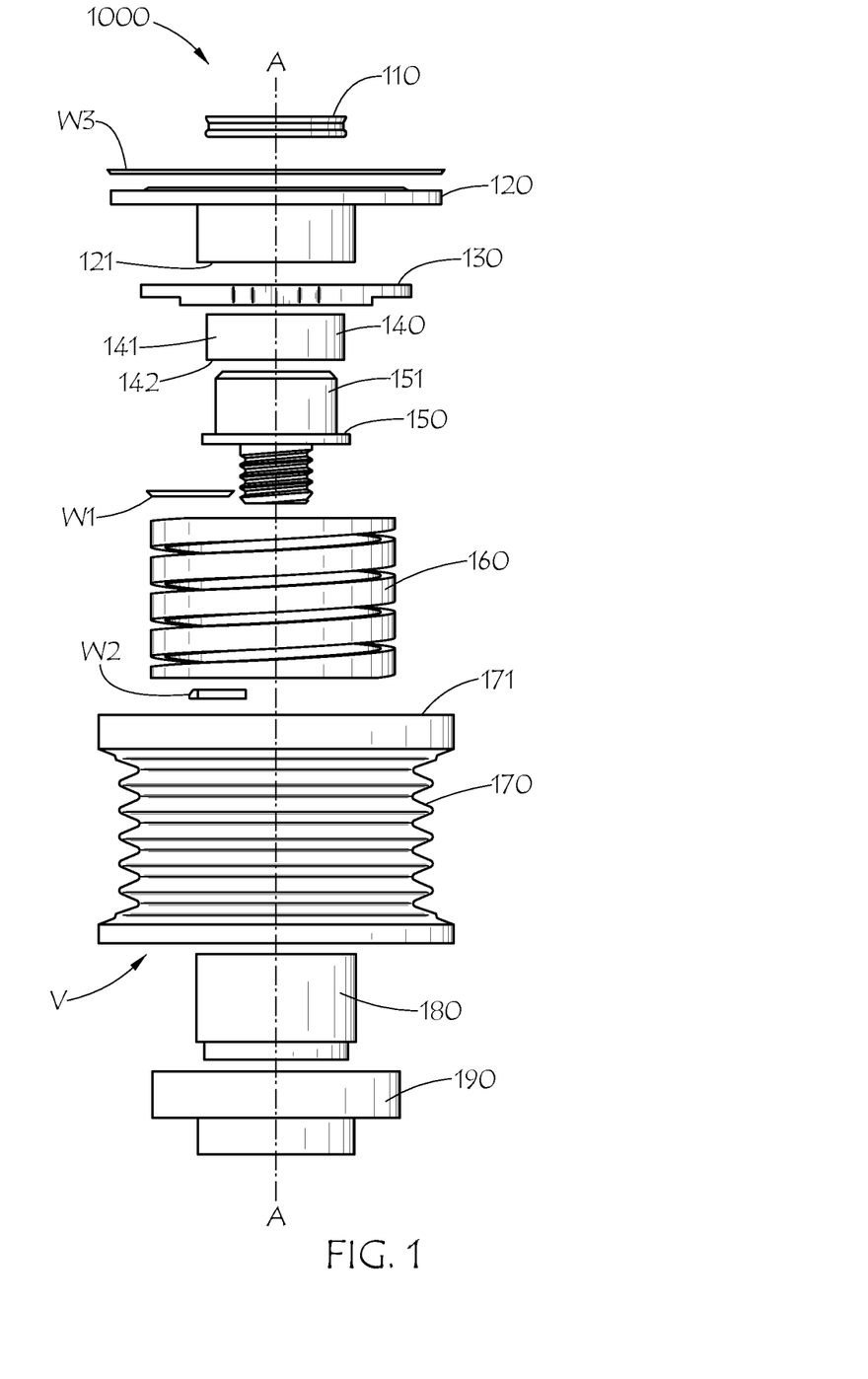
FIG. 1 is an exploded view.

FIG. 1 is an exploded view. The device 1000 comprises dust cap 110, outer plate 120, ring 130, bushing 140, screw 150, spring 160, pulley 170, shaft 180, and bearing 190.

Ring 130 is welded to an end of spring 160 with weld W1. Weld W1 extends through approximately 90°. Shaft 180 is welded to the other end of spring 160 with weld W2. Weld W2 extends through approximately 90°. Outer plate 120 is welded to pulley 170 with weld W3. Weld W3 extends through approximately 360°. Weld W1, W2 and W3 can each be accomplished by laser or other suitable weld method.

An outer surface 141 engages an inner surface 121. An inner surface 142 engages an outer surface 151. Bushing 140 is disposed between outer plate 120 and screw 150. Bushing 140 is a low friction bushing.

Dust cap 110 snaps into opening 122 in outer plate 120.

Bearing 190 is disposed between shaft 180 and pulley 170. Pulley 170 is journalled to an alternator (not shown) on bearing 190 and bushing 140. Torque is transmitted through shaft 180.

Figure 2:
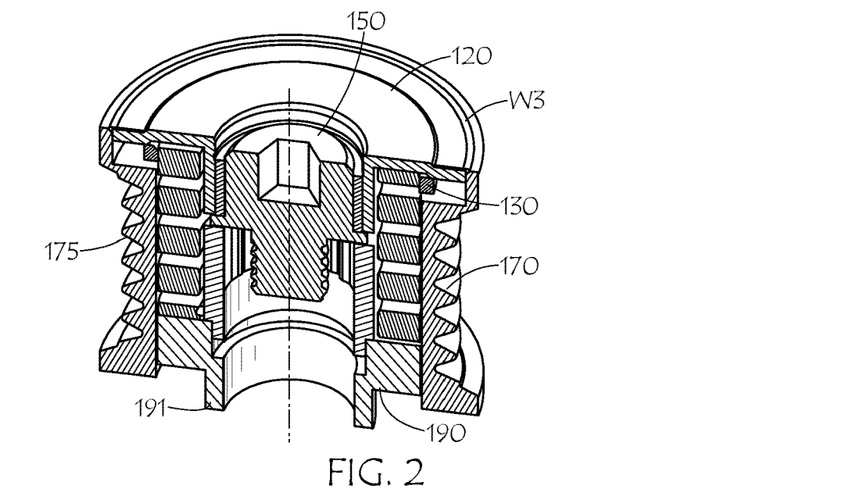
FIG. 2 is a cross section view.

FIG. 2 is a cross section view. Ring 130 is disposed between outer plate 120 and receiver 173 and receiver 174. Screw 150 fixes the device to a driven component, such as an MGU (not shown) see FIG. 9. Outer surface 175 of pulley 170 engages a belt (not shown). Bearing 190 comprises a flange 191 to engage an MGU shaft (not shown).

Figure 3:
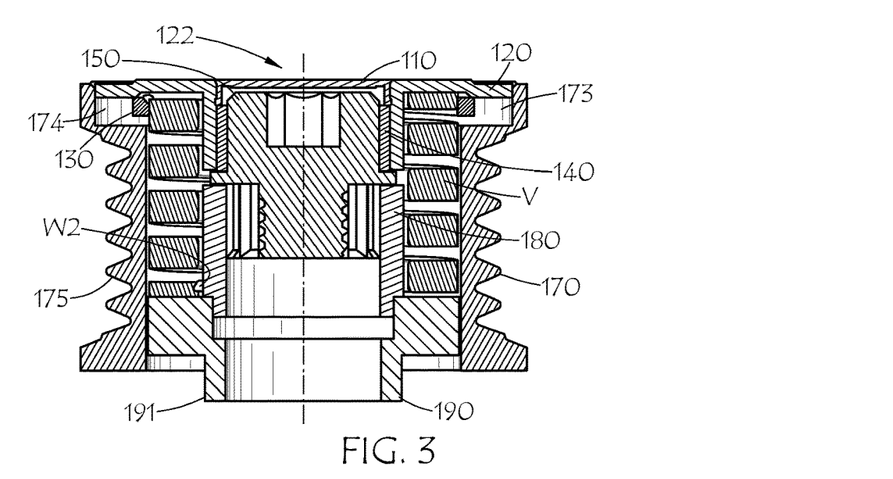
FIG. 3 is a cross section view.

FIG. 3 is a cross section view. Dust cap 110 prevents debris from entering the device.

Figure 4:
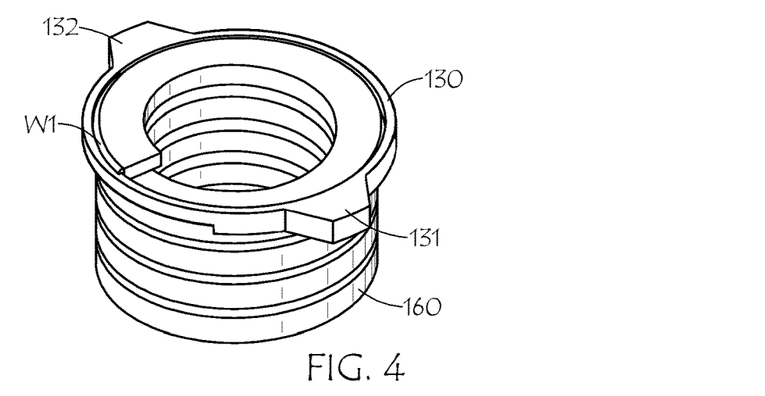
FIG. 4 is a perspective view.

FIG. 4 is a perspective view. Ring 130 comprises two radial extensions 131 and 132. Extensions 131 and 132 are spaced 180° apart. Weld W1 fixes ring 130 to an end of spring 160. Ring 130 is welded at the outer diameter of spring 160.

Figure 5:
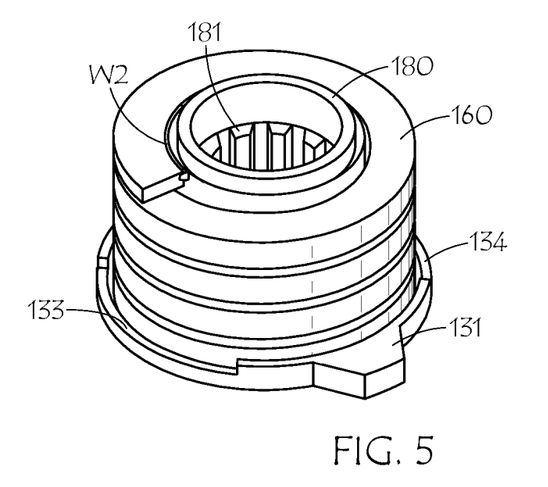
FIG. 5 is a perspective view of the bottom of FIG. 4.

FIG. 5 is a perspective view of the bottom of FIG. 4. Shaft 180 is welded to the other end of spring 160 with weld W2. Shaft 180 is welded at the inner diameter of spring 160. Shaft 180 comprises splines 181 which mechanically engage an MGU shaft (not shown). Ring 130 comprises a relief 133 and relief 134.

Figure 6:
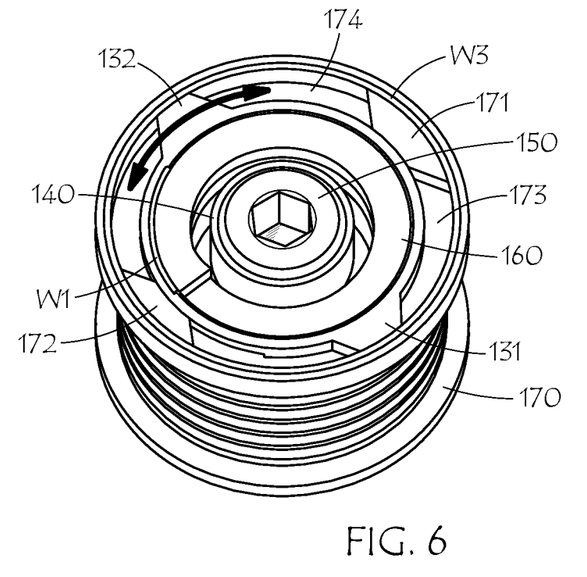
FIG. 6 is a perspective view.

FIG. 6 is a perspective view. Extension 132 engages receiver 174 and moves between stop 171 and stop 172. Extension 131 engages receiver 173 and moves between stop 171 and stop 172. Extension 132 engages stop 171 as extension 131 engages stop 172. Extension 132 engages stop 172 as extension 131 engages stop 171.

Receiver 173 and receiver 174 receive a viscous damping fluid. The damping fluid can also extend to and communicate with the pulley internal volume wherein spring 160 is disposed.

Figure 7:
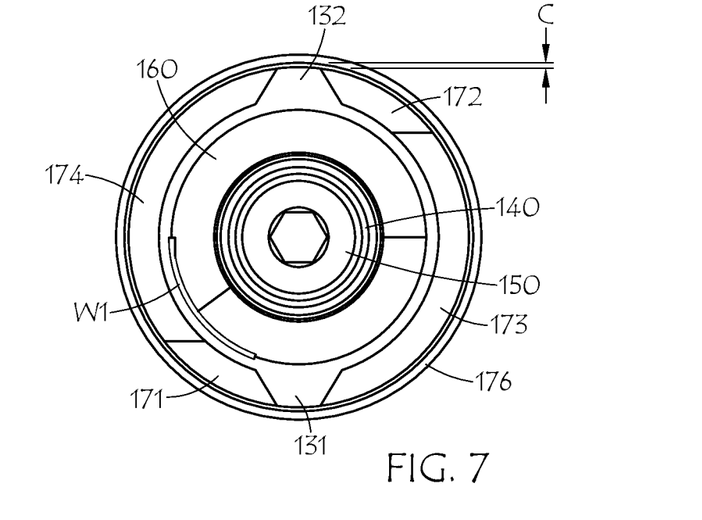
FIG. 7 is a plan view.

FIG. 7 is a plan view. A clearance C is provided between a pulley rim 176 and an outer portion of extension 132 and extension 131. Clearance C provides a path for the damping fluid to flow by extension 131 and extension 132 during operation. The width of C is tunable in accordance with design and damping requirements.

Figure 8:
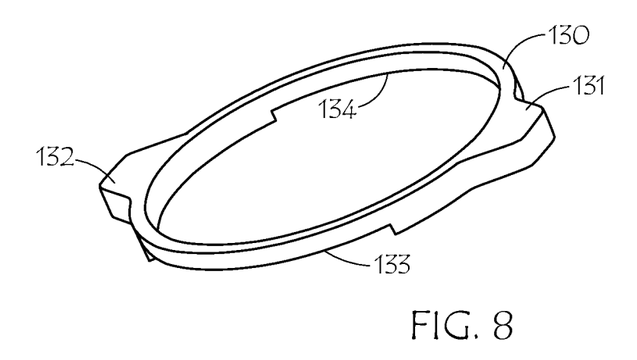
FIG. 8 is a perspective view of the ring.

FIG. 8 is a perspective view of the ring. A relief 133 is disposed between extension 131 and extension 132. A relief 134 is disposed between extension 131 and extension 132 opposite relief 133. The angular extent a of relief 133 and relief 134 are each approximately 90°. Angle α is tunable depending on design requirements.

Figure 9:
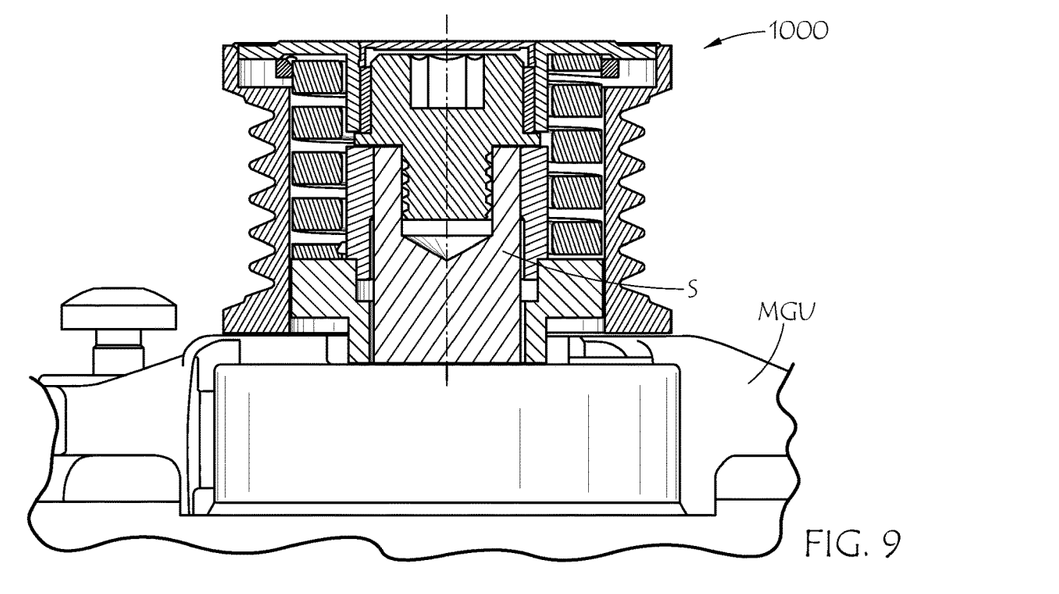
FIG. 9 is a cross section view of the installed device.

FIG. 9 is a cross section view of the installed device. The device 1000 is mounted to a shaft S of a motor generator unit (MGU).

Figure 10:
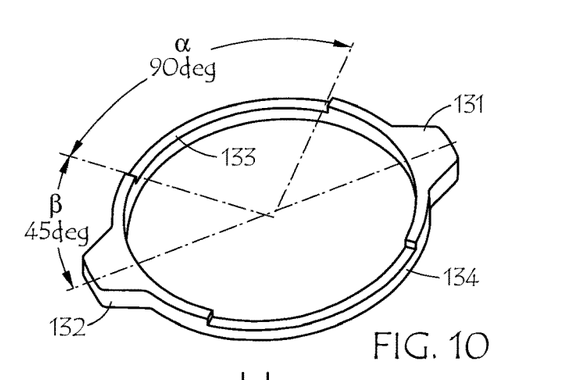
FIG. 10 is a perspective view of the ring.

FIG. 10 is a perspective view of the ring. An angle β between a centerline of extension 132 and relief 133 is approximately 45°. A like angle exists to relief 134. An angle β between a centerline of extension 131 and relief 133 is approximately 45°. A like angle exists to relief 134 as well from a centerline of extension 131.

Each relief 133 and 134 provide a passage for the damping fluid for that portion of the rotational movement of ring 130 when each extension 131 and 132 are moving between stops 171 and 172.

The dimensional characteristics of ring 130 can be changed thereby making the damping behavior of the device tunable. If the dimensional relationship between each relief 133, 134 and each stop 171 and 172 is symmetric, then the damping effect will be the same in either operational direction. The damping effect can be made different between a first operational direction and a second operational direction by changing the angle α for relief 133 from angle α for relief 134. The angle β can also be changed to alter the damping effect between operational directions as well. Of course, a change in angle α will in turn have a change on angle β.

Figure 11A:
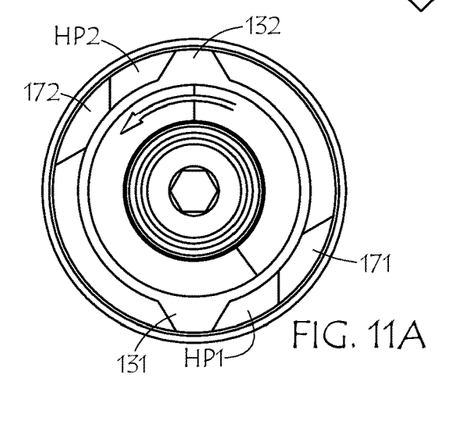
FIG. 11A shows high pressure regions for the damping fluid in a first operational direction.

FIG. 11A shows high pressure regions for the damping fluid in a first operational direction. In operation as extension 132 approaches stop 172 a high pressure region HP2 is formed in the damping fluid. Movement of ring 130 with respect to pulley 170 is indicated by the arrow. Region HP2 cushions engagement of extension 132 to stop 172, reducing noise. As extension 131 approaches stop 171 a high pressure region HP1 is formed in the damping fluid. Region HP1 cushions engagement of extension 131 to stop 171, reducing noise.

Figure 11B:
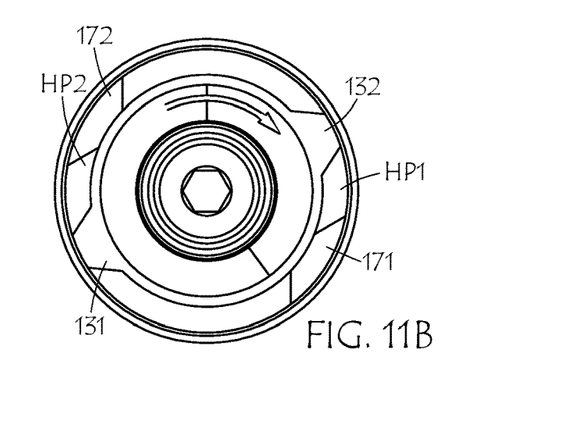
FIG. 11B shows high pressure regions for the damping fluid in a second operational direction.

FIG. 11B shows high pressure regions for the damping fluid in a second operational direction. In operation as extension 132 approaches stop 171 a high pressure region HP1 is formed in the damping fluid. Movement of ring 130 with respect to pulley 170 is indicated by the arrow. Region HP1 cushions engagement of extension 132 to stop 171, reducing noise. As extension 131 approaches stop 172 a high pressure region HP2 is formed in the damping fluid. Region HP2 cushions engagement of extension 131 to stop 172, reducing noise.

The damping fluid may comprise grease or oil. The viscosity can be in the range of approximately 68 cSt at 40 degC. to approximately 3000 cSt at 40 degC. For example, the oil may comprise Mobile® SHC 626. The grease may comprise Royal Purple® PS0711-0408. These damping fluids are examples only and are not intended to limit the scope of the invention.

The damping fluid fill for receiver 173 and receiver 174 may be in the range of approximately 50% to approximately 90%. A preferred amount is approximately 75% by volume.

Figure 12:
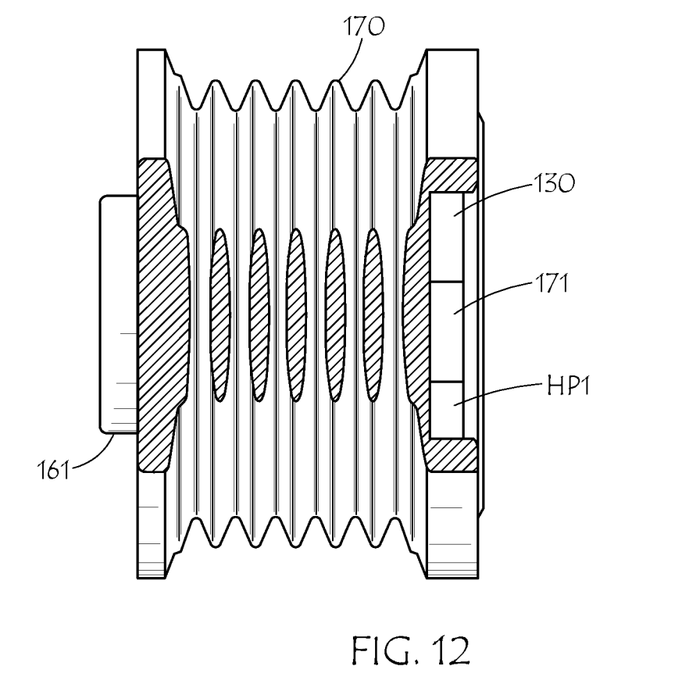
FIG. 12 is a cut away of the receiver portion.

FIG. 12 is a cut away of the receiver portion. Region HP1 is shown adjacent stop 171.

Figure 13:
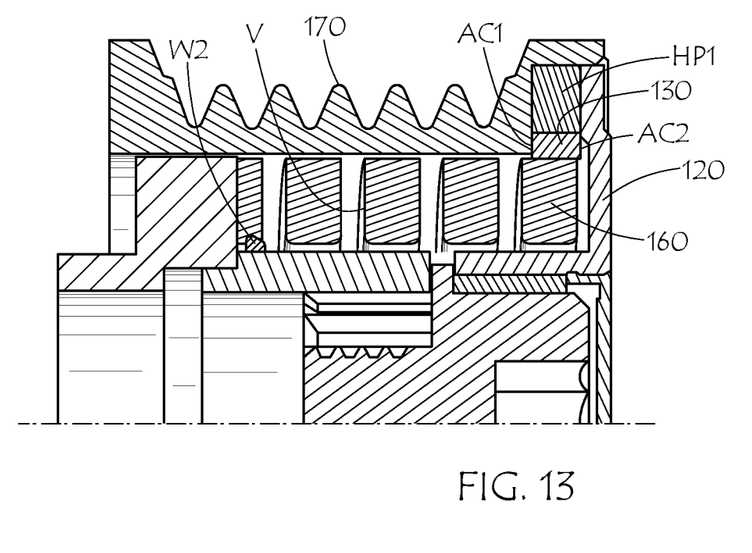
FIG. 13 is a cross section of the device.

FIG. 13 is a cross section of the device. The damping fluid can communicate with the pulley internal volume V through clearance AC1 and clearance AC2. Clearance AC1 is between ring 130 and pulley 170. Clearance AC2 is between ring 130 and outer plate 120. The damping fluid can move through clearances AC1 and AC2 from high pressure region HP1. The pulley internal volume acts as a reservoir for the damping fluid.

Movement of the damping fluid through clearances AC1 and AC2 allows for bleed down of the high pressure region HP1 and HP2 which then allows for a soft landing of the extensions on the stops which in turn reduces noise generation.

The dimension of AC1 and AC2 are tunable in order to achieve a desired bleed rate for the damping fluid in the high pressure region. Clearance AC1 and AC2 may comprise approximately 0.1 mm.

Operation

The device is typically attached to an MGU. The MGU is an accessory of a vehicle engine. If the engine is at rest and about to be started via the engine crankshaft, pulley 170 will rotate uncoupled to the MGU shaft until stops 171, 172 engage extensions 131, 132 of ring 130. This in turn transmits load into spring 160 weld 1 (W1). Spring 160 then transmits load into shaft 180 via weld 2 (W2), which then transmits load to shaft 180 causing it to rotate.

Spring 160 transmits load and it also isolates angular and torsional vibrations introduced to the system due to piston firings while the engine is running.

If the engine is started via the MGU, the MGU shaft rotates and transmits torque to shaft 180, which then transmits torque to spring 160 through weld 2 (W2). Spring 160 then transmits torque to ring 130 via weld 1 (W1). Ring 130 then rotates through receiver 173, 174 until it hits the stops 171, 172 on pulley 170. Torque is transmitted through ring 130 into the pulley 170 which drives the belt, turns the crankshaft, and starts the engine.

The ring 130 and receiver 173, 174 system not only works as a bidirectional clutch, it also functions as a decoupler. As mentioned before, between piston firings, the belt slows down. This in turn slows down the accessory pulleys. For pulleys rigidly connected to accessory shafts, the shafts slow down as well. In the instant device, if the pulley slows down relative to the shaft, stops 171, 172 will disengage from extensions 131, 132, allowing decoupling through whichever angle the receivers 173, 174 extend, 120° in the given embodiment. This decoupling serves to reduce speed fluctuations in the MGU shaft, allowing the MGU to more effectively charge the battery when in generation mode as well as reducing the harmful effects of torsional vibrations on the MGU.

When stops 171, 172 are contacted by extensions 131, 132, and torque is being transmitted in one way or another (pulley to shaft, or shaft to pulley) and the torque on one component is greater than the other (shaft torque greater than pulley torque or vice versa), torsion spring 160 is loaded to absorb/isolate the additional torque rather than transmit a torque/speed variation into the accessory system.

The use of welds to connect the ends of spring 160 the load bearing/transmitting components permits loading of the spring in either direction, winding or unwinding. This bidirectional loading capacity allows isolation effects to be produced in either direction.

A third functionality of the system is damping. This occurs during decoupling events in which extensions 131, 132 slide through the damping fluid in receivers 173, 174. Damping occurs as a result of viscous drag produced as the extensions displaces the grease in the receivers. Typically, starter generator systems require tensioners with high damping characteristics; however the utilization of a tuning device that affords damping can reduce the damping requirements of the tensioner. Furthermore, the damping exhibited by the device can be tuned by altering the type of grease used.

Clearance C between the end of extensions 131, 132 and wall of receivers 173, 174 is kept small to increase damping. This small clearance causes the grease to tend to pack up between the extensions 131 and 132 and stops 171, 172. The more tightly the grease is packed, the greater the resistance, thereby producing greater damping. To prevent total pack up which would prevent motion, reliefs 133, 134 are included in ring 130. The reliefs 133, 134 allow some grease to be displaced out of the path of the extensions 131, 132 as it moves through the receivers 173, 174. Not only do the reliefs 133, 134 work to permit motion, they also allow the grease to be continuously cycled and mixed to prevent oil separation and other detrimental effects of stagnant grease.

Ring 130 and pulley 170 are symmetric parts to allow them to function in either direction. However, ring 130 and pulley 170 can be designed asymmetrically as previously described.

Although forms of the invention have been described herein, it will be obvious to those skilled in the art that variations may be made in the construction and relation of parts without departing from the spirit and scope of the invention described herein. Unless otherwise specifically noted, components depicted in the drawings are not drawn to scale. Further, it is not intended that any of the appended claims or claim elements invoke 35 U.S.C. § 112(f) unless the words "means for" or "step for" are explicitly used in the particular claim. The present disclosure should in no way be limited to the exemplary embodiments or numerical dimensions illustrated in the drawings and described herein.

We claim:

1. An isolator comprising:
   a pulley having a first and second pulley stops;
   a plate attached to the pulley;
   a shaft;
   the pulley journalled to the shaft;
   a torsion spring attached to the shaft; and
   a damping member attached to the torsion spring, the damping member disposed between the plate and the pulley,
   wherein the damping member comprises a ring comprising two radial extensions, wherein the radial extensions are disposed between the pulley stops, and the pulley comprises a receiver, wherein the each damping member radial extension is engaged with the receiver and is rotatable through the receiver in a first direction until it hits the first pulley stop and in a second direction until it hits the second pulley stop compressing a damping fluid against the first and second pulley stops.

2. The isolator as in claim 1, wherein the plate is attached to the pulley by a weld.

3. The isolator as in claim 1, wherein the torsion spring is attached to the shaft by a weld.

4. The isolator as in claim 1, wherein the damping member is attached to the torsion spring by a weld.

5. The isolator as in claim 1, wherein the damping fluid comprises grease.

6. The isolator as in claim 1, wherein the pulley is further journalled to the shaft with a bushing, the bushing engaged with the plate.

7. The isolator as in claim 1 further comprising an attaching screw cooperating with the shaft.

8. The isolator as in claim 1, wherein the damping member comprises a relief to allow a damping fluid flow.

9. The isolator as in claim 1, wherein the viscosity of the damping fluid is in the range of 68 cSt at 40 degC to 3000 cSt at 40 degC.

10. The isolator as in claim 1 further comprising a dust cap engaged with the plate.

11. An isolator comprising:

a pulley having a first and second pulley stops;

a shaft;

the pulley journalled to the shaft;

a torsion spring attached to the shaft; and a damping member attached to the torsion spring, wherein the damping member comprises a ring comprising two radial extensions, wherein the radial extensions are disposed between the pulley stops, and the pulley comprises a receiver, wherein the each damping member radial extension is engaged with the receiver and is rotatable through the receiver in a first direction until it hits the first pulley stop and in a second direction until it hits the second pulley stop compressing a damping fluid against the first and second pulley stops.

12. The isolator as in claim 11, wherein the viscosity of the damping fluid is in the range of 68 cSt at 40 degC to 3000 cSt at 40degC.

13. An isolator comprising:

a pulley having a first and second pulley stops;

a shaft;

the pulley journalled to the shaft;

a torsion spring attached to the shaft;

a damping member attached to the torsion spring, wherein the damping member comprises a ring comprising two radial extensions, wherein the radial extensions are disposed between the pulley stops, and the pulley comprises a receiver, wherein the each damping member radial extension is engaged with the receiver and is rotatable through the receiver in a first direction until it hits the first pulley stop and in a second direction until it hits the second pulley stop compressing a damping fluid against the first and second pulley stops, the viscosity of the damping fluid in the range of 68 cSt at 40 degC to 3000 cSt at 40 degC; and a cover member attached to the pulley enclosing the receiver.

\* \* \* \* \*